March 1, 1966 R. RUSSELL 3,238,482
BALANCED ELECTRICAL WINDING PROVIDED WITH TAPS
Filed Nov. 27, 1962 2 Sheets-Sheet 1

INVENTOR.
Robert Russell
BY Lee H Kaiser
Attorney

March 1, 1966  R. RUSSELL  3,238,482
BALANCED ELECTRICAL WINDING PROVIDED WITH TAPS
Filed Nov. 27, 1962  2 Sheets-Sheet 2

INVENTOR.
Robert Russell
BY Lee H. Kaiser
Attorney

United States Patent Office 3,238,482
Patented Mar. 1, 1966

3,238,482
BALANCED ELECTRICAL WINDING PROVIDED WITH TAPS
Robert Russell, New Concord, Ohio, assignor to McGraw-Edison Company, Milwaukee, Wis., a corporation of Delaware
Filed Nov. 27, 1962, Ser. No. 240,271
6 Claims. (Cl. 336—150)

This invention relates to electrical windings for power distribution transformers and in particular to distribution transformer windings provided with taps.

When an electrical transformer is loaded, the current in the secondary winding flows in the direction around the core opposite to the direction of the current in the primary winding. As a result the primary and secondary windings repel each other. The mechanical forces between two current-carrying conductors are proportional to the product of the currents carried by each and inversely as their distance apart. These forces between transformer primary and secondary windings are relatively small under normal conditions, but under short circuit conditions the forces may be very high. For example, if 25 times full-load current flows in each winding of a transformer on short circuit, the mechanical stresses are equal to 25 squared or 625 times normal stresses.

If the primary and secondary coils are symmetrically arranged so their electrical centers are the same, the forces will be balanced. The electrical center of a winding in a symmetrical coil is the same as the physical center of the coil. However, if a winding is provided with tap sections which are inserted or removed from the circuit by operation of a tap changer, the electrical center will coincide with the physical center only when the movable contact of the tap changer is in the "neutral" position wherein 100 percent of the tapped winding is in the circuit. When the tap changer is actuated to a tap different than the 100 percent "neutral" position, the electrical center of the tapped coil will no longer be at the physical center of the coil, and consequently the mechanical forces between the tapped winding and the other winding may be very high under short circuit conditions.

In single-phase, core type transformers both the high voltage and the low voltage winding are usually divided into two sections with one section of each mounted on each leg of the magnetic core. Two 2½ percent tap sections are conventionally provided in each primary winding section so that the transformer has a tap range of 10 percent in four steps of 2½ percent. Usually the conductor turns of the two tap sections are wound in the radially innermost layers adjacent the insulating barrier which separates the high and low voltage windings, and mechanical bracing is provided to prevent the primary and secondary coils from sliding over each other under short circuit stresses. The coil bracing is sufficiently strong to withstand the forces tending to move the coils apart under short circuit conditions even when the tap changer is on the tap wherein the greatest displacement exists between the electrical centers of the primary and secondary windings.

It is an object of the invention to provide a transformer winding provided with taps wherein the mechanical forces tending to cause the primary and secondary windings to slide over each other is a minimum in all tap positions.

It is a further object of the invention to provide a core type transformer winding having taps wherein the electrical center is substantially coincident with the physical center in all tap positions.

In accordance with the preferred embodiment of the invention each tap section partially fills one layer with equal numbers of turns disposed symmetrically on opposite sides of the physical center of the winding, and the main winding section fills the winding space unoccupied by the tap sections and has equal numbers of turns disposed symmetrically in opposite sides of the physical center of the winding in both the layers partially filled by the tap sections and in the remaining layers.

These and other objects and advantages of the invention will be better understood from the following detailed description when taken in conjunction with the accompanying drawing wherein.

Figure 1:
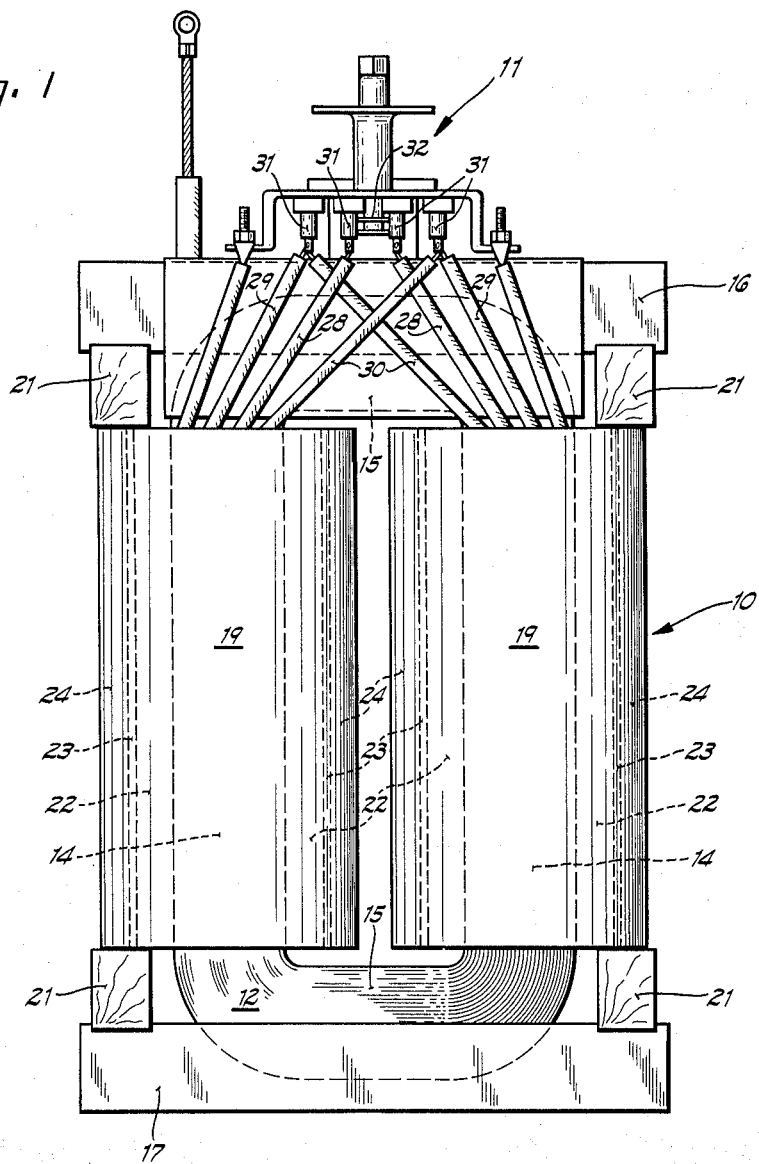
FIG. 1 is a front view of the core and coil assembly of a core type transformer provided with a tap changer and having windings embodying the invention.

FIG. 1 illustrates the core and coil assembly 10 of a core type transformer provided with a manually operated no-load tap changer 11 for varying the ratio of transformation in four steps of 2½ percent. The core and coil assembly 10 includes a closed magnetic core 12 having a pair of winding legs 14 connected by yokes 15 which are disposed within upper and lower channel braces 16 and 17 respectively. A cylindrical electrical coil 19 surrounds each core winding leg 14. Tap changer 11 is mounted on the upper brace 16. Wooden blocks 21 are disposed between the upper and lower ends of each coil 19 and the upper and lower braces 16 and 17, and the upper and lower braces 16 and 17 are connected by tie rods (not shown) to brace the coils 19 against displacement under short circuit conditions.

Each coil 19 comprises a radially inner, cylindrical low voltage winding section 22 separated by a tubular insulating barrier 23 from a radially outer, cylindrical high voltage winding section 24. In single phase, core type transformers both the high voltage and low voltage windings are usually divided into two sections, and one half, or section, 22 of the low voltage winding and one half, or section, 24 of the high voltage winding is mounted on each winding leg 14 of the magnetic core 12 to form a coil 19. The low voltage section 22 and the high voltage section 24 each comprises a plurality of concentric layers of helically wound conductor turns. Each high voltage winding section 24 is provided with first and second series connected, equal percent tap sections 26 and 27 (see FIGS. 2–4) adjacent the start of the high voltage winding section 24 and connected respectively to tap conductors 29 and 30 which are affixed to stationary contacts 31 of the tap changer 11.

When the tap changer movable contact 32 is in the "neutral" position wherein the "start" conductors 28 of both primary sections 24 are commoned and 100 percent of the high voltage winding is in the circuit, the electrical center of each primary winding section 24 substantially coincides with its physical center, the low and the high voltage sections 22 and 24 are balanced, and the mechanical forces tending to displace the high and low voltage sections relative to each other are a minimum. In other tap positions of conventional coils the electrical center of the primary winding section 24 does not coincide with its physical center, and consequently the mechanical forces tending to slide the primary and secondary sections 22 and 24 over each other are increased. Usually the first and second tap sections 26 and 27 are sequentially wound in the radially innermost layers, and the mechanical forces tending to displace the high voltage and low voltage sections 22 and 24 of conventional coils relative to each other become very high under short circuit conditions when the movable contact of the tap changer 11 is off the "neutral" position.

Figure 2:
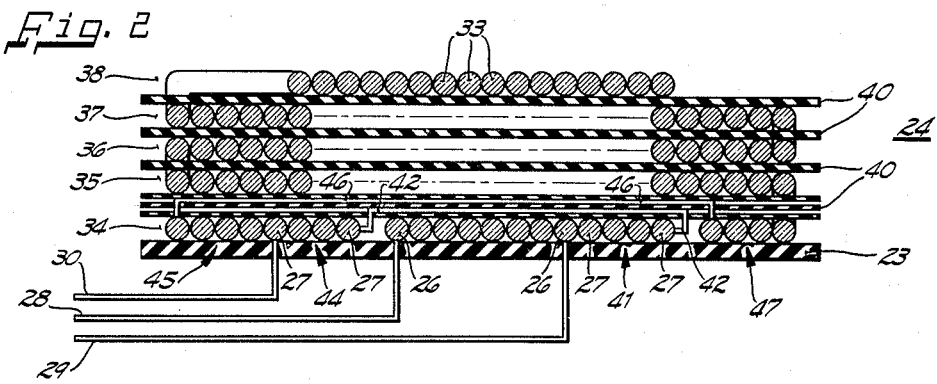
FIG. 2 is a schematic cross section view through the primary winding section of one coil of the core and coil assembly shown in FIG. 1.

FIG. 2 is a schematic cross section view through the primary winding section 24 of a coil 19 embodying the invention. Primary section 24 comprises a plurality of conductor turns 33 wound helically in concentric layers 34, 35, 36, 37, and 38 separated by interlayer sheet insulation 40. The conductor turns 33 of the radially innermost layer 34 are wound on the tubular insulation barrier 23 which separates the high voltage section 24 from the radially inward low voltage section 22.

Figure 3:
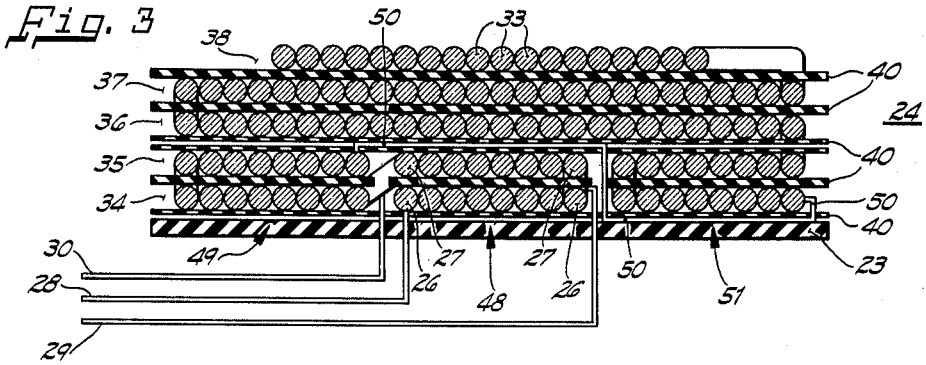
FIGS. 3 and 4 are views similar to FIG. 2 illustrating alternative embodiments of the invention.
Figure 4:
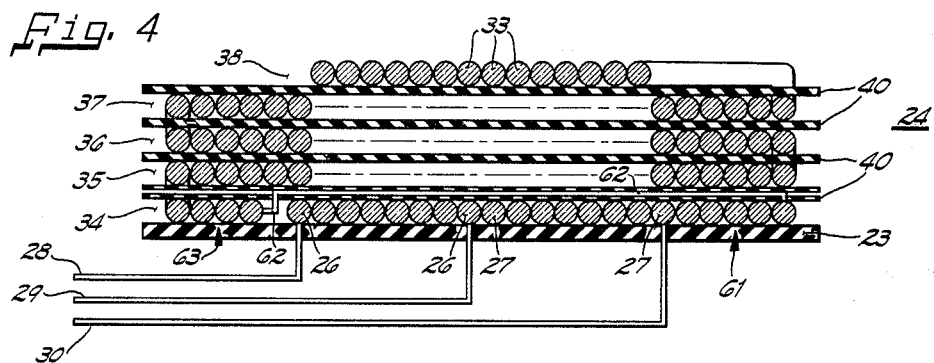

In the description of the embodiments of FIGS. 2 to 4, "left" and "right" connote directions as seen in the drawing. In the embodiment of FIG. 2 the first tap section 26 is centered in the radially innermost layer 34, i.e., section 26 is wound so that equal numbers of conductor turns 33 are symmetrically disposed to the left and to the right of the center of layer 34. The "start" conductor 28 and the "first tap" conductor 29 are equally spaced to the left and right of the center of layer 34. For the purpose of description, first tap section 26 will be termed a first winding portion.

Half of the conductor turns 33 of second tap section 27 are then wound in innermost layer 34 to the right of the first tap section 26 to form what may be termed a second winding portion 41. A jumper conductor 42 connected to the turn at the right end of the second portion 41 and disposed between turns of interlayer sheet insulation 40 permits return to the vicinity of the "start" conductor 28. The second tap section 27 is then completed by winding conductor connected to jumper strap 42 in a number of turns in layer 34 to the left of the first tap section 26 so that equal numbers of turns are symmetrically disposed to the left and right of tap section 26 and of the center of layer 34. In other words the number of turns between tap conductor 29 and strap 42 is equal and symmetrically disposed relative to the number of turns between conductor strap 42 and tap conductor 30. The turns of the half of the tap section 27 to the left of tap section 26 for purpose of description may be termed a third winding portion 44 and electrically balances the turns of the second portion 41.

The main winding section is in series with the first and second tap sections 26 and 27 and includes equal numbers of turns symmetrically disposed at opposite ends of innermost layer 34 and filling the winding space not occupied by the first and second tap sections. A number of turns 33 of conductor continuous with second tap section 27 are wound to fill up the winding space at the left end of innermost layer 34 and form what, for purpose of description, may be termed a fourth winding portion 45. A strap conductor 46 is connected to the left end turn of fourth portion 45 and is disposed between cylindrical turns of interlayer sheet insulation 40 to permit return to the right end of layer 34. Conductor turns 33 equal to the number in the fourth portion 45 are then wound at the right end of innermost layer 34 to fill up the winding space at the right end of layer 34 and form a fifth portion 47 which is symmetrically disposed relative to and electrically balances the fourth portion 45. Conductor continuous with the turns of fifth portion 47 is then wound in a plurality of turns in each of the layers 35, 36, and 37, and the conductor turns in the radially outermost layer 38 adjacent the finish of the main section are disposed centrally of the layer 38. The main winding section thus includes the turns in fourth and fifth portions 45 and 47 and the turns in layers 35, 36, 37, and 38, and it will be appreciated that equal numbers of turns of this main winding section are disposed to the left and right of the physical center of coil 19.

It will further be appreciated that the electrical center of the FIG. 2 embodiment will substantially coincide with its physical center when the movable contact 32 of the tap changer is electrically connected to the start conductor 28 or to either tap conductor 29 and 30. The conductor turns of the first tap section 26 are symmetrically disposed relative to the physical center of the coil, and the conductor turns of the second tap section 27 are also symmetrically disposed relative to the physical center of the coil. Further, the remaining turns of the primary section 24 between the second tap conductor 30 and the finish of the primary section 24 (i.e., of the main winding section) are also symmetrically disposed relative to the physical center since the fourth portion 45 and fifth portion 47, which fill up the winding space at the ends of the innermost layer, are symmetrically disposed relative to the center of layer 34 and the turns in the outermost layer 38 are also centered.

Additional insulation (not shown) may be provided between the second and fifth portions 41 and 47 and between the first and fourth portions 26 and 44 since greater than turn-to-turn voltage difference exists at these points.

The electrical center of the embodiment of the invention illustrated in FIG. 3 also coincides with its physical center regardless of the position of the tap changer 11. The first 2½ percent tap section 26 is centered in the radially innermost layer 34. The second 2½ percent tap section 27 is wound with conductor continuous with that of first tap section 26 and is centered in the layer 35 with sheet interlayer insulation 40 disposed between the two tap sections 26 and 27. The tap conductor 29 is connected to the junction of the first and second tap sections 26 and 27, and the tap conductor 30 is connected to the last conductor turn of second tap section 27. For the purpose of description the superimposed tap sections 26 and 27 of this embodiment will be termed a first winding portion 48. Conductor continuous with that of the first winding portion 48 is then wound in a plurality of turns 33 in layer 34 to the left of first tap section 26, interlayer sheet insulation 40 is positioned around these turns, and additional conductor turns are then wound in layer 35 to the left of second tap section 27 to complete what, for purpose of description, will be termed the second winding portion 49. A strap conductor 50 connected to the last turn of the second portion 49 and positioned between sheets of interlayer insulation 40 disposed between layers 35 and 36 permits return to the right end of the winding. Conductor strap 50 extends in a radially inward direction at the right end of tap sections 26 and 27 and then is bent in an axial direction and disposed between turns of insulating sheet material which form the barrier 23. Conductor electrically connected to strap 50 is then wound in innermost layer 34 to the right of tap section 26 in a number of turns equal to that in layer 34 of second portion 49 at the left of first tap section 26. Sheet interlayer insulation 40 is then placed over the turns in layer 34, and the conductor is then wound in a number of turns in layer 35 to the right of second tap section 27 equal to the number of turns in layer 35 of second winding portion 49 to the left of second tap section 27. The turns in layers 34 and 35 to the right of tap sections 26 and 27 may be termed a third portion 51 and electrically balance the turns of the second portion 49. Layers 36, 37, and 38 are then constructed in the same manner as the embodiment of FIG. 2.

Inasmuch as equal number of turns of each of the taps sections 26 and 27 occur to the left and right of the coil center; the number of turns in second portion 49 to the left of the physical center and their spacing from the center is the same as in the third portion 51 to the right of the center; and the turns in the radially outermost layer 38 are centered, it will be appreciated that the electrical center will coincide with the physical center of the coil 19 regardless of whether one, both, or neither tap section is in the circuit. Copper strap or stranded cable may be utilized for the tap conductors 29 and 30 which, if desired, may be brought out in an axial direction between layers 35 and 36.

The "start" turn in the embodiment of FIG. 4 begins in the radially innermost layer 34 and a sufficient distance to the left of the center thereof so that the conductor turn at the end of the first tap section 26 (and the first tap conductor 29) are positioned at the center of the layer 34. Additional turns 33 of conductor continuous with that of tap section 26 are wound in the layer 34 to the right of the center of the layer 34 so that second tap section 27 partially occupies the innermost layer 34 on the opposite side of the physical center from the first tap section 26 and so that the last conductor turn 33 in second tap section 27 (and thus tap conductor 30) is disposed the same distance to the right of the center of the layer as the start conductor 28 is disposed to the left thereof. Additional turns of conductor continuous with that of tap section 27 are then wound to the right of second tap section 27 to fill up the winding space at the right end of layer 34 and form what may for purpose of description be termed a third winding portion 61. A conductor strap 62 disposed between turns of the interlayer sheet insulation 40 is connected to the last conductor turn at the right end of layer 34 and permits return to the vicinity of the start conductor 28. A number of turns 33 of conductor connected to strap 62 are then wound at the left end of innermost layer 34 to form a fourth portion 63 having approximately the same number of turns as the third portion 61 at the right end of layer 34.

The fourth portion 63 is disposed symmetrically relative to and electrically balances the third portion 61. Layers 35, 36, 37, and 38 are then wound in the same manner as the embodiments of FIGS. 2 and 3 to complete the main winding section.

It will be appreciated that when the movable contact 32 of tap changer 11 engages the stationary contacts 31 connected to start conductor 28 so that 100 percent of the primary winding section 24 is in the circuit, the conductor turns of first tap section 26 to the left of the physical center electrically balance the conductor turns of the second tap section 27 to the right of the center and the conductor turns of third portion 61 at the right end of layer 34 electrically balance the conductor turns of the fourth portion 63 at the left end of layer 34 with the result that the electrical center substantially coincides with the physical center of primary section 24 and the mechanical forces tending to cause the primary section 24 and secondary section 22 to slide over each other are minimized. When the movable contact 32 of tap changer 11 engages the stationary contact connected to tap conductor 29, the first tap section 26 is removed from the circuit while the tap section 27 remains active so that the electrical center no longer exactly coincides with the physical center. However, the third and fourth portions 61 and 63 and the turns in the outermost layer 38 remain electrically balanced so that mechanical forces tending to displace primary and secondary sections 24 and 22 relative to each other are less than half those encountered with conventional construction. When the tap changer movable contact 32 engages the stationary contact connected to tap condutcor 30, both tap sections 26 and 27 are inactive and the electrical center again substantially coincides with the physical center of primary section 24.

Short circuit tests establish that transformers incorporating the invention can withstand up to 67 times rated current in all tap positions without failure whereas, in contrast, conventional transformers with the same bracing failed at short circuits currents of approximately twenty times rated current.

While only a few embodiments of the invention have been illustrated and described, many modifications and variations thereof will be readily apparent to those skilled in the art, and consequently it is intended in the appended claims to cover all such modifications and variations which fall within the true spirit and scope of the invention.

I claim:

1. A balanced cylindrical electrical winding comprising a plurality of concentric layers of conductor turns, said winding being provided with taps and having a first tap section at one electrical end of the winding, a second tap section connected to said first tap section, and an untapped section having a substantially greater number of turns than either of said tap sections connected to said second tap section, each section including a plurality of side-by-side conductor turns and each tap section having a plurality of said turns partially filling only one of said layers and having approximately equal numbers of said turns disposed symmetrically on opposite sides of the center of said one layer, said untapped section occupying the remainder of the winding space in the layers partially filled by said tap sections and having approximately equal numbers of turns disposed symmetrically on opposite sides of the center of the layers partially filled by said first and second tap sections and also the remaining layers of said winding, whereby the mechanical forces on said winding resulting from radial leakage flux are a minimum and substantially constant.

2. An electrical winding in accordance with claim 1 wherein said first and second tap sections have approximately equal number of turns and said first tap section is in the central part of the radially innermost layer and partially fills said innermost layer and has approximately the same number of turns on opposite sides of the center of said first layer and said second tap section is also in said innermost layer and has approximately equal number of turns disposed adjacent opposite ends of said first tap section.

3. An electrical winding in accordance with claim 1 wherein said first and second tap sections have approximately equal number of turns and said first tap section is disposed centrally of and partially fills the radially innermost layer of said winding and said second tap section is disposed centrally of and partially fills the second layer of said winding in a radially outward direction.

4. An electrical winding in accordance with claim 1 wherein said first and second tap sections have approximately equal number of turns and said first and second tap sections are both in the radially innermost layer of said winding and are disposed symmetrically on opposite sides of the center of said innermost layer and the tap at the junction of said first and second tap sections is disposed adjacent the center of said innermost layer.

5. A balanced cylindrical electrical winding comprising a plurality of concentric layers of conductor turns, said winding being provided with taps and having a first tap section adjacent the start of said winding, a second tap section having approximately the same number of turns as said first tap section and being connected to said first tap section, and an untapped section having a substantially greater number of turns than either of, and being connected in series with, said first and second tap sections, each section including a plurality of adjacent conductor turns and said tap sections being disposed adjacent the radially inner portion of said cylindrical winding and each tap section having turns in one only of said layers partially filling said one layer and having approximately equal numbers of turns disposed symmetrically on opposite sides of the center of said one layer, said untapped section occupying the remainder of the winding space in the layers partially filled by said tap sections and having approximately equal number of turns disposed symmetrically on opposite sides of the center of the layers partially filled by said first and second tap sections and also the remaining layers of said winding, whereby the electrical center of said winding, on opposite sides of which the winding ampere turns are equally distributed, is substantially coincident with the physical center of the winding.

6. A balanced cylindrical electrical winding comprising a plurality of concentric layers of conductor turns, said winding being provided with taps and having a first tap section including a plurality of adjacent conductor turns at one electrical end of said winding, a second tap section including a plurality of adjacent conductor turns in series with said first tap section, and an untapped section including a plurality of adjacent conductor turns and having a substantially greater number of turns than either of said tap sections and being connected in series with said first and second tap sections, each tap section having turns in one only of said layers and filling only a portion of the axial length of said one layer and having approximately equal numbers of said turns disposed symmetrically upon oppoiste sides of the center of said one layer, said untapped section having approximately equal numbers of turns disposed symmetrically on opposite sides of the center of the axial length of said winding, whereby the electrical center of said winding, on opposite sides of which the ampere turns are equally distributed, is substantially coincident with the physical center of said winding.

References Cited by the Examiner
UNITED STATES PATENTS

| | | | |
|---|---|---|---|
| 660,930 | 10/1900 | Scott | 336—150 X |
| 852,712 | 5/1907 | Frank | 336—217 |
| 2,757,347 | 7/1956 | Pozaryski | 336—150 X |

JOHN F. BURNS, *Primary Examiner.*